(12) United States Patent
Chen et al.

(10) Patent No.: US 12,507,235 B2
(45) Date of Patent: Dec. 23, 2025

(54) RESOURCE MANAGEMENT FOR SCHEDULING ASSIGNMENT IN WIRELESS COMMUNICATION

(71) Applicant: Lenovo (Beijing) Limited, Beijing (CN)

(72) Inventors: Wei Chen, Beijing (CN); Siyuan Yu, Beijing (CN); Xin Guo, Beijing (CN); Haiming Wang, Beijing (CN); Tingfang Tang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 362 days.

(21) Appl. No.: 18/549,679

(22) PCT Filed: Mar. 9, 2021

(86) PCT No.: PCT/CN2021/079721
§ 371 (c)(1),
(2) Date: Sep. 8, 2023

(87) PCT Pub. No.: WO2022/188028
PCT Pub. Date: Sep. 15, 2022

(65) Prior Publication Data
US 2024/0306148 A1    Sep. 12, 2024

(51) Int. Cl.
*H04W 72/1268* (2023.01)
*H04W 72/0453* (2023.01)
*H04W 72/51* (2023.01)

(52) U.S. Cl.
CPC ... *H04W 72/1268* (2013.01); *H04W 72/0453* (2013.01); *H04W 72/51* (2023.01)

(58) Field of Classification Search
CPC ............ H04W 72/1268; H04W 72/51; H04W 72/0453; H04W 8/22; H04W 28/16;
(Continued)

(56) References Cited

U.S. PATENT DOCUMENTS

2010/0265901 A1* 10/2010 Koo ............... H04L 5/0057
370/329
2012/0134429 A1    5/2012 Hoymann et al.
(Continued)

FOREIGN PATENT DOCUMENTS

CN         104025644 A      9/2014
CN         109309549    *   7/2017
(Continued)

OTHER PUBLICATIONS

Intel Corporation, "FL summary of critical issues for 7.2.4.2.2—V2X Mode 2", 3GPP TSG RAN WG1 Meeting #100-E, Feb. 24-Mar. 6, 2020, 26 pages.
(Continued)

*Primary Examiner* — Mewale A Ambaye
(74) *Attorney, Agent, or Firm* — FIG. 1 Patents

(57) ABSTRACT

Embodiments of the present application relate to a method and an apparatus for resource management in wireless communication. According to an embodiment of the present application, a method can include: receiving computing capability information associated with a UE; obtaining a quantization parameter for a message associated with the UE, wherein the quantization parameter is determined based on at least one of: uplink (UL) channel information between the UE and a base station (BS); and importance of information associated with the UE; determining an UL scheduling assignment for the UE based on the computing capability information and the quantization parameter; and transmitting the UL scheduling assignment and the quantization parameter to the UE. Embodiments of the present application can efficiently decrease the communication resource, time consumption, as well as communication signaling in the FL system.

20 Claims, 5 Drawing Sheets

(58) Field of Classification Search
CPC ..... H04W 72/23; H04W 72/00; H04W 12/00; H04W 4/00
See application file for complete search history.

(56) References Cited

U.S. PATENT DOCUMENTS

| | | | | |
|---|---|---|---|---|
| 2016/0013838 | A1* | 1/2016 | Zhu | H04L 5/0048 |
| | | | | 375/267 |
| 2020/0214031 | A1* | 7/2020 | Chen | H04W 72/23 |
| 2023/0079744 | A1* | 3/2023 | Cavatassi | H04L 1/0014 |
| | | | | 706/21 |
| 2025/0055539 | A1* | 2/2025 | Chen | H04L 1/1642 |

FOREIGN PATENT DOCUMENTS

| | | |
|---|---|---|
| CN | 109309549 A | 2/2019 |
| CN | 112205051 A | 1/2021 |

OTHER PUBLICATIONS

PCT/CN2021/079721, "International Seach Report and Written Opinion", PCT Application No. PCT/CN2021/079721, Dec. 8, 2021, 6 pages.

* cited by examiner

RESOURCE MANAGEMENT FOR SCHEDULING ASSIGNMENT IN WIRELESS COMMUNICATION

TECHNICAL FIELD

Embodiments of the present application generally relate to wireless communication technology, especially to a method and apparatus for resource management such as in supporting artificial intelligence (AI) services.

BACKGROUND

Based on current study items in 3rd generation partnership project (3GPP), an apparent tendency for the 5G radio access network (RAN) is to be integrated with AI technology. In 5G RAN integrated with AI technology, federated learning (FL) is studied considering its extensive utilization and unique feature of data privacy protection.

Specifically, FL allows multiple participants to build a universal and powerful machine learning model without sharing data, which can solve key issues such as data privacy, data security, data access rights, access to heterogeneous data, and so on. Therefore, FL will be extensively used in many scenarios such as defense, telecommunication, internet of things (IoT), and pharmaceutical.

However, when there are a massive number of user equipment (UEs) in an FL system, the communication in the FL system may be slower than local computation by many orders of magnitude due to limited resources such as bandwidth and power.

Given the above, the industry desires an improved technology for supporting AI services, so as to efficiently decrease the communication resource, time consumption, as well as communication signaling in the FL system.

SUMMARY OF THE APPLICATION

Some embodiments of the present application at least provide a technical solution for resource management in supporting AI services.

According to some embodiments of the present application, a method may include: receiving computing capability information associated with a UE; obtaining a quantization parameter for a message associated with the UE, wherein the quantization parameter is determined based on at least one of: uplink (UL) channel information between the UE and a base station (BS); and importance of information associated with the UE; determining a UL scheduling assignment for the UE based on the computing capability information and the quantization parameter; and transmitting the UL scheduling assignment and the quantization parameter to the UE.

In an embodiment of the present application, obtaining the quantization parameter includes: determining the quantization parameter based on at least one of: the UL channel information; and the importance of information associated with the UE.

In an embodiment of the present application, the method may further include: transmitting the UL channel information between the UE and the BS to a server; and receiving the quantization parameter and an indicator indicating to determine the UL scheduling assignment for the UE from the server.

In an embodiment of the present application, the method may further include: transmitting the UL channel information between the UE and the BS to a core network (CN); and receiving the quantization parameter and an indicator indicating to determine the UL scheduling assignment for the UE from the CN.

In an embodiment of the present application, the UL channel information is transmitted to a user plane function (UPF) of the CN, and the method may further include: transmitting an identity (ID) of the UE and an ID of a server together with the UL channel information.

In an embodiment of the present application, the UL channel information is transmitted to an access and mobility management function (AMF) of the CN.

In an embodiment of the present application, the quantization parameter is received from a UPF of the CN, and the method may further include: receiving an ID of the UE together with the quantization parameter and the indicator.

In an embodiment of the present application, the quantization parameter and the indicator are received from an AMF of the CN.

In an embodiment of the present application, the UL scheduling assignment includes resources in time and frequency domains for the UE to report a quantized message.

In an embodiment of the present application, the method may further include: receiving the quantized message on resources in time and frequency domains indicated by the UL scheduling assignment.

In an embodiment of the present application, the method may further include: transmitting the quantized message to a server or a CN.

In an embodiment of the present application, the quantization parameter indicates a number of quantization levels associated with the message.

According to some other embodiments of the present application, a method may include: receiving UL channel information between a UE and a BS; determining a quantization parameter for a message associated with the UE based on at least one of: the UL channel information between the UE and the BS; and importance of information associated with the UE; and transmitting the quantization parameter.

In an embodiment of the present application, the UL channel information is received from the BS, and the method may further include: transmitting an indicator indicating to determine the UL scheduling assignment for the UE together with the quantization parameter to the BS.

In an embodiment of the present application, the UL channel information is received from a CN, and the method may further include: transmitting the quantization parameter to the CN.

In an embodiment of the present application, the UL channel information is received from a UPF of the CN, and the method may further include: receiving an ID of the UE and an ID of a server together with the UL channel information.

In an embodiment of the present application, the UL channel information is received from a network data analytics function (NWDAF) of the CN.

In an embodiment of the present application, the quantization parameter is transmitted to a UPF of the CN, and the method may further include: transmitting an ID of the UE together with the quantization parameter and the indicator.

In an embodiment of the present application, the quantization parameter is transmitted to a RAN management assistant function (RMAF) of the CN.

In an embodiment of the present application, the method may further include: receiving a quantized message associated with the UE from the BS or from a CN.

According to some other embodiments of the present application, a method may include: receiving UL channel information between a UE and a BS from the BS; transmitting the UL channel information to a server; and receiving a quantization parameter for a message associated with the UE from the server; wherein the quantization parameter is determined based on at least one of: the UL channel information between the UE and the BS; and importance of information associated with the UE.

In an embodiment of the present application, the method may further include: generating an indicator indicating to determine the UL scheduling assignment for the UE; and transmitting the quantization parameter and the indicator to the BS.

In an embodiment of the present application, the UL channel information is received by a UPF of a CN, and the method may further include: receiving an ID of the UE and an ID of the server together with the UL channel information.

In an embodiment of the present application, the UL channel information is received by an AMF of a CN.

In an embodiment of the present application, the quantization parameter is received by a UPF of the CN, and the method may further include: receiving an ID of the UE together with the quantization parameter and the indicator.

In an embodiment of the present application, the quantization parameter is received by a RMAF, and the method may further include: generating an indicator indicating to determine the UL scheduling assignment for the UE by the RMAF; and transmitting the quantization parameter and the indicator by an AMF of the CN.

In an embodiment of the present application, the method may further include: receiving a quantized message associated with the UE from the BS; and transmitting the quantized message to the server.

According to some other embodiments of the present application, a method may include: transmitting computing capability information associated with a UE; and receiving a UL scheduling assignment and a quantization parameter for a message associated with the UE, wherein the UL scheduling assignment is determined based on the computing capability information and the quantization parameter, and the UL scheduling assignment indicates a report time for reporting a quantized message from the UE.

In an embodiment of the present application, the UL scheduling assignment includes resources in time and frequency domains for the UE to report the quantized message.

In an embodiment of the present application, the method may further include: finishing updating the message before the report time indicated in the UL scheduling assignment.

In an embodiment of the present application, the method may further include: transmitting the quantized message on the resources in time and frequency domains indicated by the UL scheduling assignment.

Some embodiments of the present application also provide an apparatus, include: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a technical solution for supporting AI services, which can efficiently decrease the communication resource, time consumption, as well as communication signaling in the FL system.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G (NR), 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
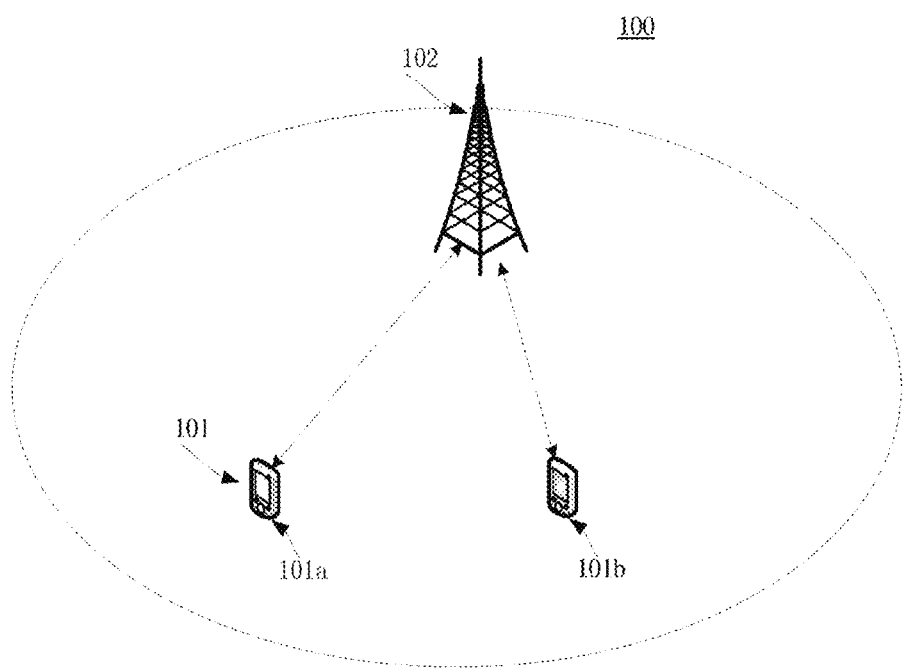
FIG. 1 is a schematic diagram illustrating an exemplary wireless communication system according to some embodiments of the present application.

FIG. 1 is a schematic diagram illustrating an exemplary wireless communication system according to some embodiments of the present application.

As shown in FIG. 1, a wireless communication system 100 includes at least one user equipment (UE) 101 and at least one base station (BS) 102. In particular, the wireless communication system 100 includes two UEs 101 (e.g., UE 101a and UE 101b) and one BS 102 for illustrative purpose. Although a specific number of UEs 101 and BS 102 are depicted in FIG. 1, it is contemplated that any number of UEs 101 and BSs 102 may be included in the wireless communication system 100.

In some embodiments of the present application, the UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some other embodiments of the present application, the UE(s) 101 may include wearable devices, such as smart watches, fitness bands, optical head-mounted displays, or the like. Moreover, the UE may be referred to as a subscriber unit, a mobile, a mobile station, a user, a terminal, a mobile terminal, a wireless terminal, a fixed terminal, a subscriber station, a user terminal, or a device, or described using other terminology used in the art. In an embodiment of the present application, the UE(s) 101 may be a pedestrian UE (P-UE), a cyclist UE, a vulnerable road user (VRU), a vehicle UE (V-UE), or the like.

Both UE 101*a* and UE 101*b* in the embodiments of FIG. 1 may transmit information to BS 102 and receive control information from BS 102, for example, via LTE or NR Uu interface. The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the downlink (DL) and the UE(s) 101 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS(s) 102 may communicate with the UE(s) 101 using the 3GPP 5G protocols.

Based on current study items in 3GPP, 5G RAN tends to be integrated with AI technology, wherein FL will be studied considering its extensive utilization and unique feature of data privacy protection.

Different from both the traditional centralized machine learning (ML) techniques and traditional decentralized ML techniques, FL is a ML technique that can train algorithms among multiple distributed participants (e.g., participating devices or UEs) that store local data samples to avoid exchanges. Instead, the traditional centralized ML techniques need to upload all local data sets to the server, and the traditional decentralized ML techniques usually assume the same distribution of local data samples.

Specifically, according to FL, a shared global model (or a shared prediction model, global inference model, or global model etc.) is trained under the coordination of a central server, e.g., an edge data network (EDN) server, from a federation of participating devices (e.g., UEs). The participating devices are typically large in number and have slow or unstable internet connections. A principal motivating example for FL arises when the training data comes from users' interaction with applications on the participating devices. FL enables the participating devices to collaboratively learn a shared prediction model while keeping all the training data on the participating devices, that is, the training data is kept locally on the participating devices, and the participating devices perform computation on their local training data in order to update a global model. Accordingly, FL decouples the ability to do machine learning from the need to store the data in the cloud.

For example, a typical procedure of a FL may include the following steps, which will be performed iteratively during the FL lifetime:

1) A UE within a subset of selected UEs downloads a current global model from an EDN server via a BS. The current global model may be maintained in the EDN server which directly or indirectly connects to the BS or is integrated into the BS.
2) The UE obtains an updated model by a model training procedure based on its local data and reports the updated model to the EDN server via the BS; and
3) The EDN server aggregates all received models to construct an improved global model. In an example, the improved global model may be constructed by averaging all received models.

However, in some aspects, FL is disadvantageous over conventional distributed machine learning due to the very large number of participating devices, highly unbalanced and non-independent and identically distributed data available on each participating device, and relatively poor network connections. Thus, communication is a critical bottleneck in FL systems due to limited resources such as bandwidth and power.

One method to deal with the above problems in the FL is the local updating method, i.e., mini-batch optimization method. The mini-batch optimization method involves extending a classic random method to process multiple data points at once, and has become a popular paradigm for distributed machine learning in data center environments.

In a federated environment, the mini-batch optimization method that allow flexible local updates and less customer involvement have become de facto solutions. One minibatch optimization method most commonly used in the federated environment is the federated average (i.e., FedAvg), which is based on averaging the local stochastic gradient descent (SGD) updates of the original problem. It has been proved that the FedAvg can work well empirically, but it has no convergence guarantee, and divergence can occur in the actual environment when the data is heterogeneous. In other words, in order to improve communication efficiency, the mini-batch optimization method abandons part of the less important data, thereby slowing down the speed of model convergence.

Another method to deal with the above problems in the FL is the model compression scheme. Different from the local update method, which can reduce the total number of communication rounds, the model compression scheme, such as sparsification, sub-sampling and quantization can significantly reduce the size of messages delivered in each communication round.

The model compression scheme has been extensively studied empirically and theoretically for distributed training in a data center environment. However, in a federated environment, the low participation of devices, differently distributed local data and local update solutions pose new challenges to these model compression methods. Moreover, the convergence of the model compression scheme is not guaranteed by theory at present.

Given the above, embodiments of the present application provide a novel technical solution of resource management for supporting AI services. According to some embodiments of the present application, the novel technical solution is a joint management solution of computing-communication for FL over wireless channel, such that the communication resource, time consumption, as well as communication signaling in the FL system can be decreased by the following aspects:

1) A message update method with diverse quantization accuracies is proposed. In the message update method, an EDN server determines quantification parameters for a certain accuracy of the message according to the UL channel information between the UE and the BS and the importance of the information from the UE; and
2) Since the EDN server determines the quantification parameters for the UE, the BS may know the predicted data to be reported from the UE to the BS in advance. Therefore, the BS determines the UL scheduling assignment for the UE without UL scheduling request from the UE.

More details on the embodiments of the present application will be illustrated in the following text in combination with the appended drawings.

Figure 2:
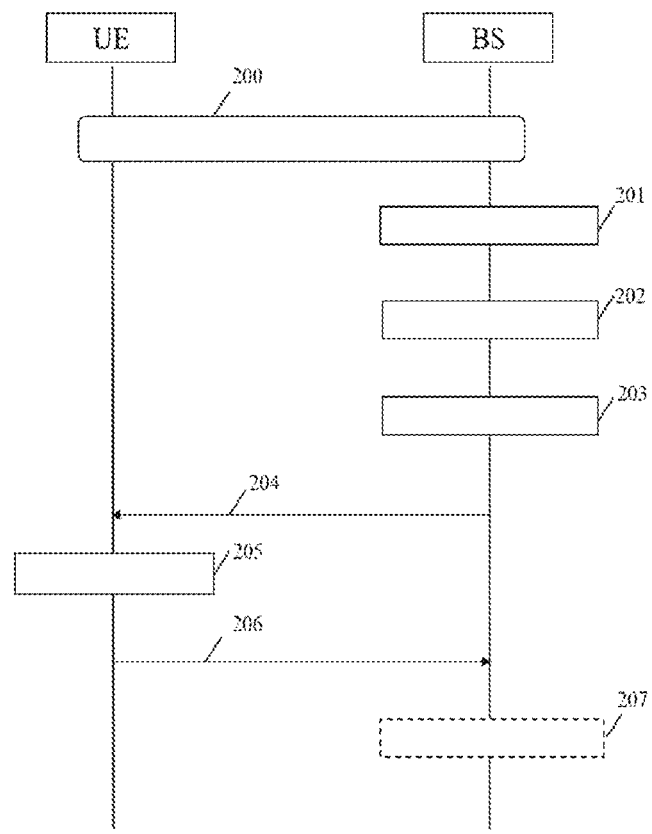
FIG. 2 is a flow chart illustrating a method for resource management in supporting AI services according to some embodiments of the present application.

FIG. 2 is a flow chart illustrating a method for resource management in supporting AI services according to some embodiments of the present application. In the embodiment of FIG. 2, a server which is used to determine quantization parameters is integrated into a BS. The server may be an EDN server, a content server, a cloud server, or any other server which can determine quantization parameters associated with a UE. Accordingly, in the embodiment of FIG. 2, the BS determines quantization parameters and generates UL scheduling assignment directly for UE.

Referring to FIG. 2, in step 200, a UE (e.g., the UE 101*a* or UE 101*b* in FIG. 1) may transmit capability information associated with the UE to a BS (e.g., the BS 102 in FIG. 1). In some embodiments of the present application, the capability information associated with the UE may be defined by the computing power of the UE, such as how many times of floating computation per second can be done by the UE.

Optional, in step 201, the BS may obtain UL channel information between the UE and the BS. In some embodiments of the present application, the UL channel information may be channel state information (CSI), signal quality of the UL signal received by the base station, or any other information which can indicate the UL channel state between the BS and the UE. In some embodiments of the present application, the UL channel information may be obtained by an existing procedure between the UE and the BS, e.g., a UL CSI acquisition procedure performed between the UE and BS. In some other embodiments of the present application, the UL channel information may be obtained based on the AI-based technology. According to some other embodiments of the present application, step 201 may be not performed between the UE and the BS.

In step 202, the BS, e.g., by the server integrated into the BS may determine a quantization parameter for a message associated with the UE based on at least one of: the UL channel information between the UE and the BS obtained in step 201, and importance of information associated with the UE. The quantization parameter may also be referred to as quantization accuracy in some other embodiments of the present application. The importance of information may be replaced with required data accuracy in some other embodiments of the present application.

In some embodiments of the present application, the message associated with the UE may be a message associated with the local model on the UE, for example, a gradient of a local model or an updated local model, the local model, or an updated local model. In some other embodiments, the message associated with the UE may be any other message which needs to be reported to the BS.

In some embodiments of the present application, the importance of information associated with the UE may be received from the UE. In such embodiments, information associated with the UE may be user data on the UE, for example, data samples for training the local model on the UE. In some other embodiments of the present application, the importance of information may be determined by the BS. Accordingly, the information associated with the UE may be a local model reported by the UE.

In some embodiments of the present application, the quantization parameter indicates a number of quantization levels, which may be defined by quantization bits of the message.

In some embodiments of the present application, the BS may determine a quantization parameter for the message associated with the UE based on both the UL channel information and the importance of information. In an embodiment of the present application, for the UE with better CSI and more important information, the BS may assign higher quantization accuracy to the UE. For example, the quantization parameter may indicate 64 bits for quantization. After receiving the quantization parameter, the UE may adopt 64-bit floating-point numbers to quantize the message. In another embodiment of the present application, for the UE with worse CSI and less important information, the BS may assign lower quantization accuracy to the UE. For example, the quantization parameter may indicate 32 bits or 16 bits for quantization. After receiving the quantization parameter, the UE may correspondingly adopt 32-bit or 16-bit floating-point numbers to quantize the message.

In some other embodiments of the present application, the BS may determine a quantization parameter for the message associated with the UE only based on the importance of data or the required data accuracy. In an embodiment of the present application, for important information, the quantization accuracy should be always higher even if the channel quality is bad. In such an embodiment, the BS may assign more resources to the UE so that the data accuracy can be secured. For example, the quantization parameter may indicate 64 bits for quantization. After receiving the quantization parameter, the UE may adopt 64-bit floating-point numbers to quantize the message. In another embodiment of the present application, for the less important information, the quantization accuracy may be lower in most of cases even if the channel quality is good. That means that the higher data accuracy may not help the global model. In such as embodiment, the quantization parameter may indicate 32 bits or 16 bits for quantization. After receiving the quantization parameter, the UE may correspondingly adopt 32-bit or 16-bit floating-point numbers to quantize the message.

After determining the quantization parameter, in step 203, the BS may determine a UL scheduling assignment for the UE based on the computing capability information of the UE and the quantization parameter. The UL scheduling assignment may be determined without receiving a scheduling request from the UE. The UL scheduling assignment includes resources in time and frequency domains for the UE to report a quantized message from the UE. The resources in time domain indicate a report time for reporting the quantized message, which means that the UE should finish updating the message before the report time. In some embodiments of the present application, the UL scheduling assignment may explicitly indicate the report time to the UE.

After determining the UL scheduling assignment, in step 204, the BS may transmit the UL scheduling assignment and the quantization parameter to the UE. In some embodiments of the present application, the UL scheduling assignment may be transmitted to the UE via downlink control information (DCI). In some embodiments of the present application, the quantization parameter may be transmitted to the UE via at least one of: the DCI in which the UL scheduling assignment is transmitted, a media access control (MAC) control element (CE), and a physical uplink shared channel (PUSCH) indicated by the DCI.

After receiving the UL scheduling assignment and the quantization parameter, in step 205, the UE may perform a message update procedure based on the user data on the UE. In the case that the message is the local model on the UE, performing the local model update procedure may include training data samples on the UE to generate an updated local model. In some embodiments of the present application, the message update procedure may be performed further based on the quantization parameter. For example, for the UE with lower information importance, quantified neural network training may be adopted. For the UE with higher information importance, traditional neural network training is adopted. The UE may finish the message update procedure before the report time indicated in the UL scheduling assignment.

After the message update procedure, the UE may obtain an updated message. The UE may quantize the updated message to generate a quantized message based on the quantization parameter. In some embodiments of the present application, the quantized message may be a quantized gradient of the updated local model or a quantized updated local model. Then, in step 206, the UE may report the quantized message to the BS on the resources in time and frequency domains indicated by the UL scheduling assignment.

After receiving the quantized message, in step 207, the BS, e.g., by the server integrated into the BS may perform a global model convergence based on the updated local model(s) indicated by the quantized message from UE(s). Although only one UE is depicted in FIG. 2, it is contemplated that one or more UEs may be used for determining the global model. Each of the one or more UEs may perform the same or similar method in FIG. 2 to report the quantized message to the BS, such that the BS may perform a global model convergence based on at least one local model reported from the one or more UEs.

In the embodiment of FIG. 2 or the like, the server (e.g., an EDN server) used to determine the quantization parameter is integrated into the BS. However, in some other embodiments of the present application, the server is separated from the BS.

Figure 3:
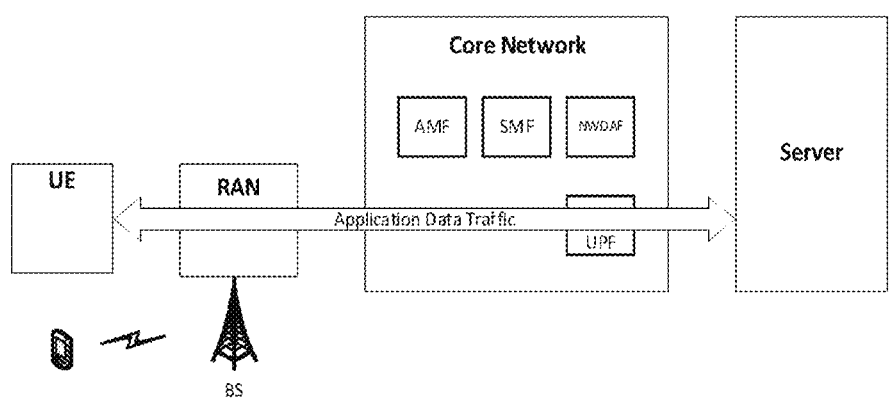
FIG. 3 illustrates an exemplary network architecture for supporting AI services according to some embodiments of the present application.

FIG. 3 illustrates an exemplary network architecture for supporting AI services according to some embodiments of the present application. In the embodiment of FIG. 3, the server is separated from the BS. The server may be connected to the BS via a CN.

As shown in FIG. 3, the network architecture may include a UE, a RAN, a CN, and a server. The RAN may at least include a BS. The CN may at least include an AMF, a session management function (SMF), a NWDAF, and a UPF.

The AMF is a part of the control plane processing on the CN side. The AMF receives the non-access stratum (NAS) signaling from the UE via the RAN and is also connected to the BS for control plane signaling between the RAN and the CN. The AMF is mainly responsible for connection management, mobility management, and so on. The AMF provides transport and proxy for session management (SM) messages between the UE and the SMF.

The SMF is mainly responsible for session management, such as session establishment, modification, and release, including maintenance of the tunnel between the UPF and the BS.

The NWDAF may be used for analysis of network slicing related data as specified in 3GPP standard documents.

The UPF is general responsible for user plane processing. The UPF is mainly responsible for performing all UPFs on the packets, such as forwarding, routing, quality of service (QOS), and so on.

Similarly, the server may be an EDN server, a content server, a cloud server, or any other server which can determine the quantization parameters. Referring to FIG. 3, there is application data traffic between the UE and the server as illustrated.

Figure 4:
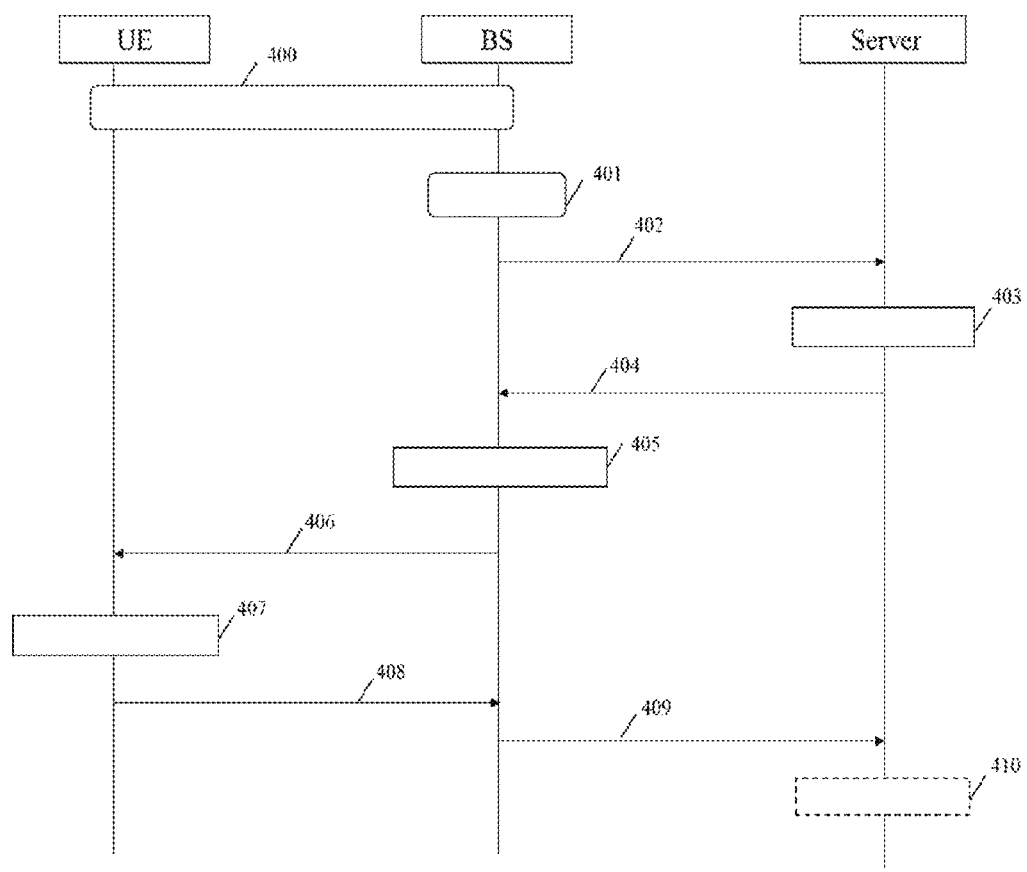
FIG. 4 is a flow chart illustrating a method for resource management in supporting AI services according to some other embodiments of the present application.

FIG. 4 is a flow chart illustrating a method for resource management in supporting AI services according to some other embodiments of the present application. In the embodiment of FIG. 4, a server which is used to determine quantization parameters is separated from a BS as shown in FIG. 3. The server determines quantization parameters and transmits an indicator to the BS to indicate the BS to generate UL scheduling assignment for the UE. The server may be an EDN server, a content server, a cloud server, or any other server which can determine quantization parameters associated with a UE.

Referring to FIG. 4, in step 400, a UE (e.g., the UE 101*a* or UE 101*b* in FIG. 1) may transmit capability information associated with the UE to a BS (e.g., the BS 102 in FIG. 1). In some embodiments of the present application, the capability information associated with the UE may be defined by the computing power of the UE, such as how many times of floating computation per second can be done by the UE.

Optional, in step 401, the BS may obtain UL channel information between the UE and the BS. The operation performed in step 401 may be the same as or similar to the operation performed in step 201 in FIG. 2.

After obtaining the UL channel information, in step 402, the BS may transmit the UL channel information between the UE and the BS to the server. In some embodiments of the present application, the UL channel information may be transported to the server via the UPF of the CN. In such embodiments, the BS may transmit an ID of the UE and an ID of the server together with the UL channel information to the server via the UPF of the CN. For example, the UL channel information with the ID of the UE and the ID of the server are conveyed in data and transported via the UPF of the CN.

After receiving the UL channel information (as well as the ID of the UE and the ID of the server in some embodiments), in step 403, the server may determine a quantization parameter for a message associated with the UE based on at least one of: the UL channel information between the UE and the BS; and importance of information associated with the UE. The quantization parameter may also be referred to as quantization accuracy in some other embodiments of the present application. The importance of information may be replaced with required data accuracy in some other embodiments of the present application.

In some embodiments of the present application, the message associated with the UE may be a message associated with the local model on the UE, for example, a gradient of a local model or an updated local model, the local model, or an updated local model. In some other embodiments of the present application, the message associated with the UE may be any other message which needs to be reported to the BS.

In some embodiments of the present application, the importance of information associated with the UE may be received from the UE. In such embodiments, information associated with the UE may be user data on the UE, for example, data samples for training the local model on the UE. In some other embodiments of the present application, the importance of information may be determined by the server. In such embodiments, the information associated with the UE may be a local model reported by the UE.

In some embodiments of the present application, the quantization parameter indicates a number of quantization levels, which may be defined by quantization bits of the message.

In some embodiments of the present application, the server may determine a quantization parameter for the message associated with the UE based on both the UL channel information and the importance of information. In an embodiment of the present application, for the UE with better CSI and more important information, the server may assign higher quantization accuracy to the UE. For example, the quantization parameter may indicate 64 bits for quantization. After receiving the quantization parameter, the UE may adopt 64-bit floating-point numbers to quantize the message. In another embodiment of the present application, for the UE with worse CSI and less important information, the server may assign lower quantization accuracy to the UE. For example, the quantization parameter may indicate 32 bits or 16 bits for quantization. After receiving the quantization parameter, the UE may correspondingly adopt 32-bit or 16-bit floating-point numbers to quantize the message.

In some other embodiments of the present application, the server may determine a quantization parameter for the message associated with the UE only based on the importance of data or the required data accuracy. In an embodiment of the present application, for important information, the quantization accuracy should be always higher even the channel quality is bad. In such as embodiment, the BS may assign more resources to the UE so that the data accuracy can be secured. For example, the quantization parameter may indicate 64 bits for quantization. After receiving the quantization parameter, the UE may adopt 64-bit floating-point numbers to quantize the message. In another embodiment of the present application, for the lower important information, the quantization accuracy may be lower in most of cases even if the channel quality is good. That means that the higher data accuracy may not help the global model. In such an embodiment, the quantization parameter may indicate 32 bits or 16 bits for quantization. After receiving the quantization parameter, the UE may correspondingly adopt 32-bit or 16-bit floating-point numbers to quantize the message.

After determining the quantization parameter, in step 404, the server may transmit the quantization parameter and an indicator indicating the BS to determine a UL scheduling assignment for the UE to the BS.

In some embodiments of the present application, the quantization parameter and the indicator may be transported to the BS via the UPF (e.g., the UPF as shown in FIG. 3) of the CN. In such embodiments, the server may transmit an ID of the UE together with the quantization parameter and the indicator to the BS via the UPF of the CN. For example, the quantization parameter and the indicator are conveyed in data and transported via the UPF of the CN with the BS as the destination, while the ID of the UE is also indicated in the data.

In response to the quantization parameter and the indicator from the server, the BS may determine a UL scheduling assignment for the UE based on the computing capability information of the UE and the quantization parameter in step 405. The operation performed in step 405 may the same as or similar to the operation performed in step 203 in FIG. 2.

After determining the UL scheduling assignment, in step 406, the BS may transmit the UL scheduling assignment and the quantization parameter to the UE. In some embodiments of the present application, the UL scheduling assignment may be transmitted to the UE via DCI. In some embodiments of the present application, the quantization parameter may be transmitted to the UE via at least one of: the DCI in which the UL scheduling assignment is transmitted, a MAC CE, and a PUSCH indicated by the DCI.

After receiving the UL scheduling assignment and the quantization parameter, in step 407, the UE may perform a message update procedure based on the user data on the UE. The operation performed in step 407 may be the same as or similar to the operation performed in step 205 in FIG. 2. For example, the UE may finish the message update procedure before the report time indicated in the UL scheduling assignment.

After the message update procedure, the UE may obtain an updated message. The UE may quantize the updated message to generate a quantized message based on the quantization parameter. In some embodiments of the present application, the quantized message may be a quantized gradient of the updated local model or a quantized updated local model. Then, in step 408, the UE may report the quantized message to the BS on the resources in time and frequency domains indicated by the UL scheduling assignment. After receiving the quantized message, in step 409, the BS may transmit the quantized message to the server.

After receiving the quantized message, in step 410, the server may perform a global model convergence based on updated local model(s) indicated by the quantized message from UE(s). Similarly, although only one UE is depicted in FIG. 4, it is contemplated that one or more UEs may be used for determining the global model. Each of the one or more UEs may perform the same or similar method illustrated in FIG. 4 to report the quantized message to the BS, such that the BS may perform a global model convergence based on at least one local model reported from the one or more UEs.

Figure 5:
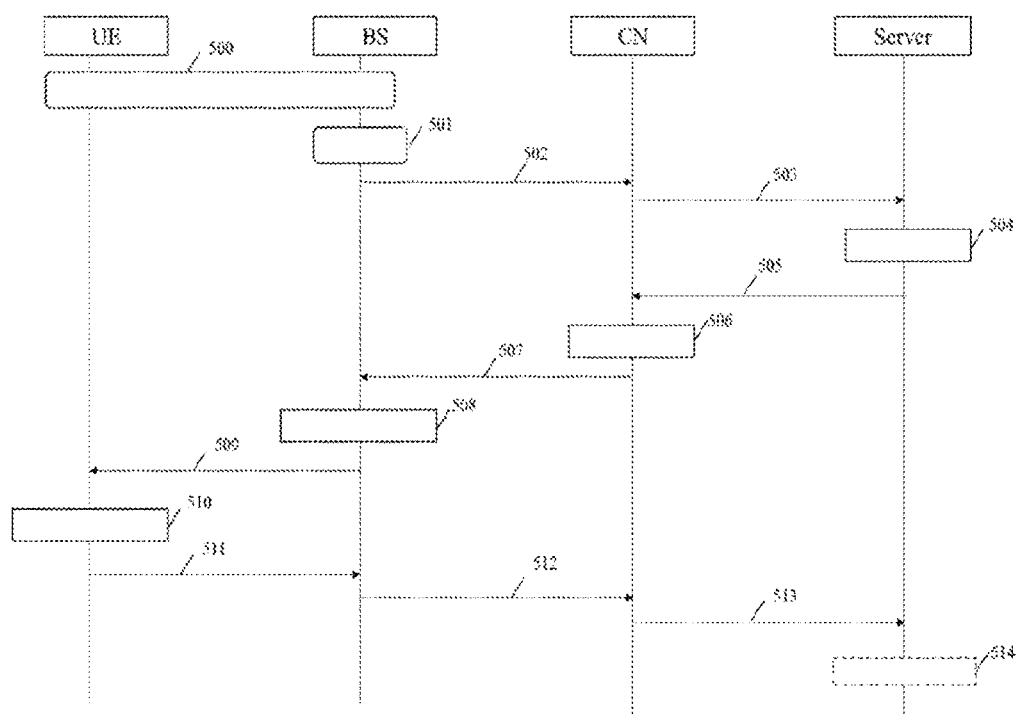
FIG. 5 is a flow chart illustrating a method for resource management in supporting AI services according to some other embodiments of the present application.

FIG. 5 is a flow chart illustrating a method for resource management in supporting AI services according to some other embodiments of the present application. In the embodiment of FIG. 5, a server which is used to determine quantization parameters is also separated from a BS as shown in FIG. 3. The server determines quantization parameters and the BS generates UL scheduling assignment for the UE. Different from the embodiment in FIG. 4, in the embodiment of FIG. 5, the CN generates an indicator and transmit the indicator to the BS to indicate the BS to generate the UL scheduling assignment for the UE. The server may be an EDN server, a content server, a cloud server, or any other server which can determine quantization parameters associated with a UE.

Referring to FIG. 5, in step 500, a UE (e.g., the UE 101a or UE 101b in FIG. 1) may transmit capability information associated with the UE to a BS (e.g., BS 102 in FIG. 1). In some embodiments of the present application, the capability information associated with the UE may be defined by the computing power of the UE, such as how many times of floating computation per second can be done by the UE.

Optional, in step 501, the BS may obtain UL channel information between the UE and the BS. The operation performed in step 501 may the same as or similar to the operation performed in step 401 in FIG. 4.

After obtaining the UL channel information, in step 502, the BS may transmit the UL channel information between the UE and the BS to the CN. After receiving the UL channel information, in step 503, the CN may transmit the UL channel information to the server.

In some embodiments of the present application, the UL channel information may be transported to the UPF of the CN, and then the UPF of the CN may transport the UL channel information to the server. In such embodiments, the BS may transmit an ID of the UE and an ID of the server together with the UL channel information to the UPF of the CN. For example, the UL channel information with the ID of the UE and the ID of the server are conveyed in data and transported to the UPF of the CN such that the UPF may transport the data to the server.

In some other embodiments of the present application, the UL channel information may be transported via the control plane of the CN. For example, the UL channel information is transmitted to an AMF (e.g., the AMF in FIG. 3) of the CN. Then, the AMF may transmit the UL channel information to an NWDAF (e.g., the NWDAF in FIG. 3) of the CN, and then the NWDAF may transmit the UL channel information to the server.

After receiving the UL channel information (as well as the ID of the UE and the ID of the server in some embodiments), in step 504, the server may determine a quantization parameter for a message associated with the UE based on at least one of: the UL channel information between the UE and the BS obtained in step 201; and importance of information associated with the UE. The operation performed in step 504 may the same as or similar to the operation performed in step 403 in FIG. 4.

After determining the quantization parameter, in step 505, the server may transmit the quantization parameter to the CN.

In some embodiments of the present application, the quantization parameter may be transported to the UPF (e.g., the UPF as shown in FIG. 3) of the CN. In such embodiments, the server may transmit an ID of the UE together with the quantization parameter to the UPF of the CN. For example, the quantization parameter and the ID of the UE are conveyed in data and transported to the UPF of the CN such that the UPF of the CN may transport the data to the BS as the destination.

In some other embodiments of the present application, the quantization parameter may be transmitted to a new network function in CN. The new network function may be referred to as a RAN management assistant function (RMAF). The key functionality of the RMAF is to provide RAN management related assistant information from CN to the BS. The RMAF may be specified either as a standalone network function in the CN or as new functionalities added to a legacy network function, such as AMF in the CN.

After receiving the quantization parameter, in step 506, the CN may generate an indicator indicating the BS to determine a UL scheduling assignment for the UE. In some embodiments of the present application, the indicator may be generated by the RMAF in the CN.

After generating the indicator, in step 507, the CN may transmit the quantization parameter and the indicator to the BS. In some embodiments of the present application, the quantization parameter as well as the indicator may be transmitted to the BS from the AMF of the CN. In some other embodiments of the present application, the quantization parameter may be transmitted from the UPF to the BS while the indicator may be transmitted to the BS from the AMF in the CN. When the quantization parameter is transmitted to the BS from the UPF, the UPF may also transmit the ID of the UE together with the quantization parameter to the BS. For example, the quantization parameter and the ID of the UE are conveyed in data and transported via the UPF of the CN with the BS as the destination.

In response to receiving the quantization parameter and the indicator from the server, the BS may determine a UL scheduling assignment for the UE based on the computing capability information of the UE and the quantization parameter in step 508. The operation performed in step 508 may the same as or similar to the operation performed in step 405 in FIG. 4.

After determining the UL scheduling assignment, in step 509, the BS may transmit the UL scheduling assignment and the quantization parameter to the UE. In some embodiments of the present application, the UL scheduling assignment may be transmitted to the UE via DCI. In some embodiments of the present application, the quantization parameter may be transmitted to the UE via at least one of: the DCI in which the UL scheduling assignment is transmitted, a MAC CE, and a PUSCH indicated by the DCI.

After receiving the UL scheduling assignment and the quantization parameter, in step 510, the UE may perform a message update procedure based on the user data on the UE. The operation performed in step 510 may be the same as or similar to the operation performed in step 407 in FIG. 4. For example, the UE may finish the message update procedure before the report time indicated in the UL scheduling assignment.

After the message update procedure, the UE may obtain an updated message. The UE may quantize the updated message to generate a quantized message based on the quantization parameter. In some embodiments of the present application, the quantized message may be a quantized gradient of the updated local model or a quantized updated local model. Then, in step 511, the UE may report the quantized message to the BS on the resources in time and frequency domains indicated by the UL scheduling assignment. After receiving the quantized message, in step 512, the BS may transmit the quantized message to the CN. The CN may transmit the quantized message to the server in step 513. In some embodiments of the present application, the quantized message may be transported from the BS to the server via the UPF of the CN.

After receiving the quantized message, in step 514, the server may perform a global model convergence based on the updated local model(s) indicated by the quantized message from the UE(s). Similarly, although only one UE is depicted in FIG. 5, it is contemplated that one or more UEs may be used for determining the global model. Each of the one or more UEs may perform the same or similar method as illustrated in FIG. 5 to report the quantized message to the BS, such that the BS may perform a global model convergence based on at least one local model reported from the one or more UEs.

Figure 6:
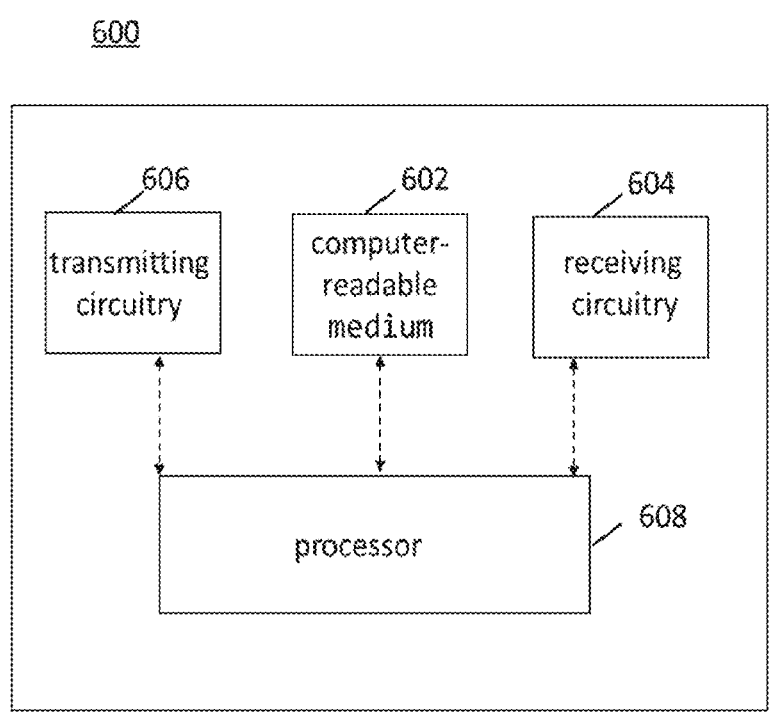
FIG. 6 illustrates a simplified block diagram of an apparatus for resource management in supporting AI services according to some embodiments of the present application.

FIG. 6 illustrates a simplified block diagram of an apparatus for supporting AI services according to some embodiments of the present application. The apparatus 600 may be a server, a BS, a CN, or a UE as shown in FIGS. 2 and 4-5.

Referring to FIG. 6, the apparatus 600 may include at least one non-transitory computer-readable medium 602, at least one receiving circuitry 604, at least one transmitting circuitry 606, and at least one processor 608. In some embodiments of the present application, at least one receiving circuitry 604 and at least one transmitting circuitry 606 and be integrated into at least one transceiver. The at least one non-transitory computer-readable medium 602 may have computer executable instructions stored therein. The at least one processor 608 may be coupled to the at least one non-transitory computer-readable medium 602, the at least one receiving circuitry 604 and the at least one transmitting circuitry 606. The computer executable instructions can be programmed to implement a method with the at least one receiving circuitry 604, the at least one transmitting circuitry 606 and the at least one processor 608. The method can be a method according to an embodiment of the present application, for example, the methods shown in FIGS. 2 and 4-5.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for resource management in supporting AI services, including a processor and a memory. Computer programmable instructions for implementing a method for resource management in supporting AI services are stored in the memory, and the processor is configured to perform the computer programmable instructions to implement the method for resource management in supporting AI services. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for resource management in supporting AI services as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A method performed by a base station (BS), the method comprising:
  receiving computing capability information associated with a user equipment (UE);
  obtaining a quantization parameter for a message associated with the UE, wherein the quantization parameter is determined based on at least one of: uplink (UL) channel information between the UE and a base station (BS), or an importance of information associated with the UE;
  determining an UL scheduling assignment for the UE based at least in part on the computing capability information and the quantization parameter; and
  transmitting the UL scheduling assignment and the quantization parameter to the UE.

2. The method of claim 1, further comprising:
  transmitting the UL channel information between the UE and the BS to a server; and
  receiving the quantization parameter and an indicator indicating to determine the UL scheduling assignment for the UE from the server.

3. The method of claim 1, further comprising:
  transmitting the UL channel information between the UE and the BS to a core network (CN); and
  receiving the quantization parameter and an indicator indicating to determine the UL scheduling assignment for the UE from the CN.

4. The method of claim 3, wherein the UL channel information is transmitted to a user plane function (UPF) of the CN, and the quantization parameter is received from the UPF of the CN; and the method further comprises:
transmitting an identity (ID) of the UE and an ID of a server together with the UL channel information; and
receiving the ID of the UE together with the quantization parameter and the indicator.

5. The method of claim 3, wherein the UL channel information is transmitted to an access and mobility management function (AMF) of the CN, and the quantization parameter and the indicator are received from the AMF of the CN.

6. The method of claim 1, wherein the UL scheduling assignment includes resources in time and frequency domains for the UE to report a quantized message; and the method further comprises:
receiving the quantized message on the resources in the time and frequency domains indicated by the UL scheduling assignment; and
transmitting the quantized message to at least one of a server or a core network (CN).

7. The method of claim 1, wherein the quantization parameter indicates a number of quantization levels associated with the message.

8. A user equipment (UE) for wireless communication, comprising:
at least one memory; and
at least one processor coupled with the at least one memory and configured to cause the UE to:
transmit computing capability information associated with the UE; and
receive an uplink (UL) scheduling assignment and a quantization parameter for a message associated with the UE, wherein the UL scheduling assignment is determined based on the computing capability information and the quantization parameter, and the UL scheduling assignment indicates a report time for reporting a quantized message from the UE.

9. The UE of claim 8, wherein the quantization parameter is determined based on at least one of UL channel information or an importance of information associated with the UE.

10. The UE of claim 8, wherein the quantization parameter indicates a number of quantization levels associated with the message.

11. A base station (BS) for wireless communication, comprising:
at least one memory; and
at least one processor coupled with the at least one memory and configured to cause the base station to:
receive computing capability information associated with a user equipment (UE);
obtain a quantization parameter for a message associated with the UE, wherein the quantization parameter is determined based on at least one of: uplink (UL) channel information between the UE and the BS, or an importance of information associated with the UE; and
transmit an UL scheduling assignment and the quantization parameter to the UE, wherein the UL scheduling assignment is determined for the UE based at least in part on the computing capability information and the quantization parameter.

12. The BS of claim 11, wherein the at least one processor is configured to cause the BS to:
transmit the UL channel information between the UE and the BS to a server; and
receive the quantization parameter and an indicator indicating to determine the UL scheduling assignment for the UE from the server.

13. The BS of claim 11, wherein the at least one processor is configured to cause the BS to:
transmit the UL channel information between the UE and the BS to a core network (CN); and
receive the quantization parameter and an indicator indicating to determine the UL scheduling assignment for the UE from the CN.

14. The BS of claim 13, wherein:
the UL channel information is transmitted to a user plane function (UPF) of the CN, and the quantization parameter is received from the UPF of the CN; and
wherein the at least one processor is configured to cause the BS to:
transmit an identity (ID) of the UE and an ID of a server together with the UL channel information; and
receive the ID of the UE together with the quantization parameter and the indicator.

15. The BS of claim 13, wherein the UL channel information is transmitted to an access and mobility management function (AMF) of the CN, and the quantization parameter and the indicator are received from the AMF of the CN.

16. The BS of claim 11, wherein:
the UL scheduling assignment includes resources in time and frequency domains for the UE to report a quantized message; and
wherein the at least one processor is configured to cause the BS to:
receive the quantized message on the resources in the time and frequency domains indicated by the UL scheduling assignment; and
transmit the quantized message to at least one of a server or a core network (CN).

17. The BS of claim 11, wherein the quantization parameter indicates a number of quantization levels associated with the message.

18. A method performed by a user equipment (UE), the method comprising:
transmitting computing capability information associated with the UE; and
receiving an uplink (UL) scheduling assignment and a quantization parameter for a message associated with the UE, wherein the UL scheduling assignment is determined based on the computing capability information and the quantization parameter, and the UL scheduling assignment indicates a report time for reporting a quantized message from the UE.

19. The method of claim 18, wherein the quantization parameter is determined based on at least one of UL channel information or an importance of information associated with the UE.

20. The method of claim 18, wherein the quantization parameter indicates a number of quantization levels associated with the message.

* * * * *